United States Patent [19]

McMurtry et al.

[11] Patent Number: 5,697,620
[45] Date of Patent: Dec. 16, 1997

[54] SEAL ASSEMBLY HAVING FIRST AND SECOND SEALS ACTING IN SERIES

[75] Inventors: David R. McMurtry; Jonathan S. Sullivan, both of Wotton-Under-Edge, United Kingdom

[73] Assignee: Renishaw PLC, Gloucestershire, United Kingdom

[21] Appl. No.: 689,023

[22] Filed: Jul. 30, 1996

[30] Foreign Application Priority Data

Aug. 2, 1995 [GB] United Kingdom ............... 9515823

[51] Int. Cl.⁶ .................................................. F16J 15/16
[52] U.S. Cl. ....................................... 277/58; 277/144
[58] Field of Search ........................... 277/58, 85, 144, 277/152, 188 A, 188 R, 236

[56] References Cited

U.S. PATENT DOCUMENTS

| | | | |
|---|---|---|---|
| 2,483,827 | 10/1949 | Guiler | 277/188 R |
| 2,587,810 | 3/1952 | Beyer | 277/188 R |
| 2,962,314 | 11/1960 | Rickard | 277/188 R |
| 3,559,733 | 2/1971 | Kilgore | 277/188 R |
| 3,687,465 | 8/1972 | Grime et al. | 277/188 R |
| 4,310,163 | 1/1982 | Pippert | 277/188 A |
| 4,379,558 | 4/1983 | Pippert | 277/188 A |

FOREIGN PATENT DOCUMENTS

| | | |
|---|---|---|
| 359053 | 3/1990 | European Pat. Off. . |
| 708278 | 4/1996 | European Pat. Off. . |
| 3843291 | 7/1990 | Germany . |
| 2277593 | 11/1994 | United Kingdom . |

*Primary Examiner*—Scott Cummings
*Attorney, Agent, or Firm*—Oliff & Berridge

[57] ABSTRACT

To provide a better seal for example in an indexing arm for a machine tool to prevent swarf getting to the rubber seal, an outer spring seal is provided. The seal takes the form a closely wound coil spring formed into a ring and positioned in a slightly expanded state in a vee-grove at the entrance to the space being sealed. The spring is compliant enough to allow for slight axial and transverse relative movements of the two parts of the arm and is hard enough not to be damaged by swarf or the limited relative rotation between the parts during indexing.

9 Claims, 2 Drawing Sheets

SEAL ASSEMBLY HAVING FIRST AND SECOND SEALS ACTING IN SERIES

The present invention relates to sealing devices capable of preventing the passage of particulate matter and fluids between relatively rotatable members, e.g. parts of a component of a machine, e.g. a machine tool, while at the same time allowing limited relative translational movements of the parts.

According to the present invention there is provided a sealing device for preventing passage of fluid and particulate matter between two members which are relatively rotatable and subject to limited relative translational movements, said device comprising an outer seal positioned between the members in contact with a surface of each member and exposed on one side thereof to the fluid and particulate matter, and an inner seal positioned between the members in contact with a surface of each member and exposed on side thereof to fluid which has passed through the outer seal and wherein:

the outer seal is a compliant member made from a relatively hard material capable of preventing passage of the particulate material therethrough, and the inner seal is a compliant member made from a relatively soft material capable of preventing passage of fluid therethrough.

In one embodiment of the invention the outer seal is made in the form of a metallic spring having closely wound coils such that in its unstressed state the coils are in contact. The spring is formed into a circular shape and is stretched over the outer periphery of the seal into a groove specifically designed to receive it. The inner seal consists of a conventional face seal moulded from rubber or plastic.

The invention will now be more particularly described with reference to the accompanying drawings in which.

Figure 1:
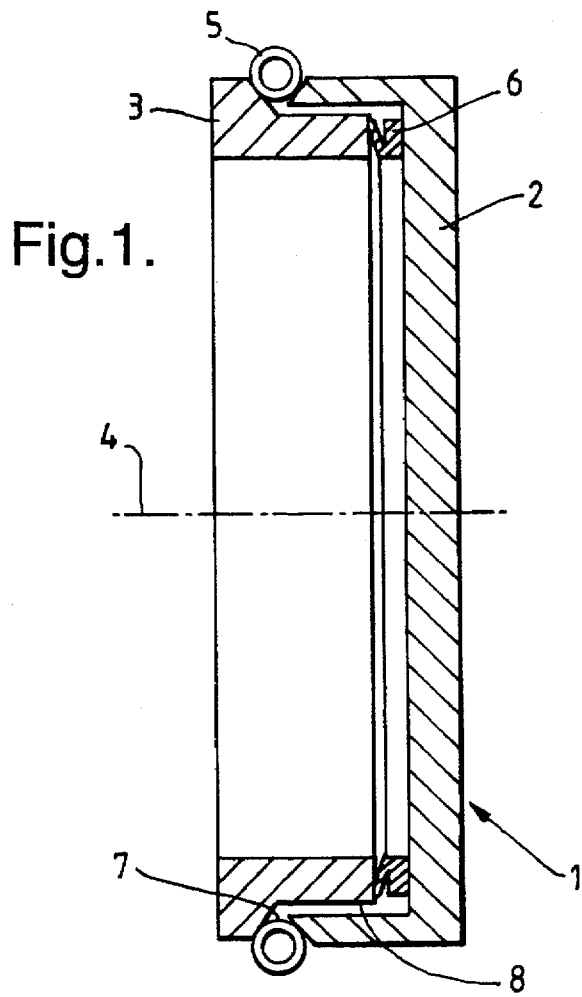
FIG. 1 is a section through a component including a sealing device of the present invention.
Figure 2:
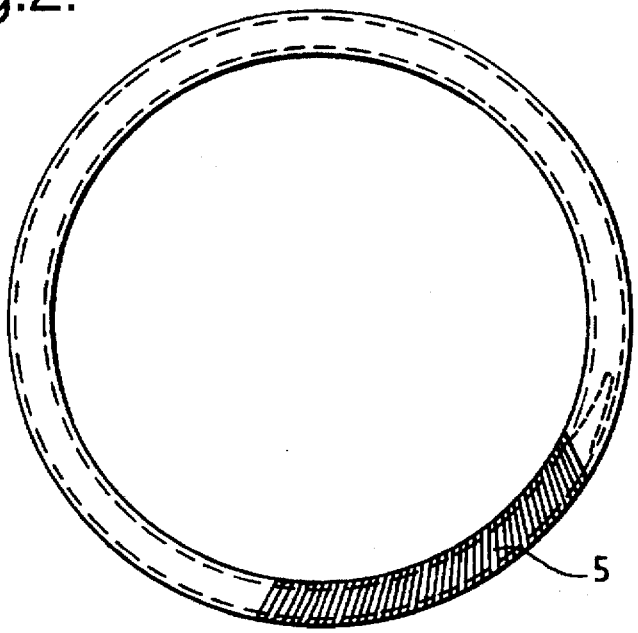
FIG. 2 is a detail of the outer seal of the sealing device.

Referring now to FIGS. 1 and 2 of the drawings, the component indicated generally by reference numeral 1 includes a first member 2 and a second member 3 which are capable of a limited amount of relative rotation about an axis 4. The members 2 and 3 may be, or may be attached to relatively rotatable parts of a machine component.

The sealing device of the present invention consists of an outer seal 5 which is exposed to the fluid containing the particulate matter against which the component is to be sealed, and an inner seal 6 which is only exposed to any fluid which gets past the outer seal.

The inner seal 6 may be a conventional face seal moulded from a rubber or plastics material.

The novel features of the invention are the construction of the outer seal 5, and its combination in series with an inner seal 6 to form an effective barrier to both the fluid and the particulate matter.

The outer seal 5 is made in the form of a tightly wound spring, such that in its relaxed state the coils are in contact. The spring is tapered at one end and is formed into a ring by inserting the tapered end into the hollow interior at the other end. As the tapered end is pushed in the coils of the spring at the other end are expanded and grip the coils of the tapered portion effectively locking it in place. The grip is such that the spring ring can be expanded to pass over the members 2 and 3 without coming apart and fit into a groove 7 at the entrance to the space 8 to be sealed in a slightly expanded condition.

The groove 7 has inclined side walls thus forming a vee-shape and the spring ring, due to its stretched condition, sits down in the groove in contact with the side walls to form a seal. However, due to the stretched condition of the spring a slight gap will open up between the individual coils so that the spring ring does not form a complete seal against the fluid, but by careful design the gaps between the coils will be too small to allow the particulate matter into the space being sealed.

The pressure and velocity of the fluid to which the spring is exposed, will be considerably reduced as it passes between the coils of the spring, thus improving the conditions under which the second seal 6 has to work.

We have also found that the fluid entering the spring ring through the gaps between the coils will tend to run around the hollow interior of the spring and drain out through the lowest point reducing the quantity of fluid to be dealt with by the second seal.

Small relative radial and axial movements between the members 2 and 3 of the component will cause relative movements of the sides of the vee groove 7. These are accommodated by flexing of the spring either increasing or reducing the tension thereof without causing loss of contact between the spring and the sides of the vee groove.

The sealing device is suitable for use in components in which one part is indexable relative to the other between different positions, or in components in which one part is rotatable at low speed and for intermittent periods of time but is not suitable in circumstances of continuous, high speed relative rotation between parts of a component.

We have found that the above-described embodiment of the invention is particularly suitable in a machine tool environment for preventing swarf, which is produced by the machine tool and which is carried in the stream of lubricant circulating around the working area, from getting into components which are mounted in the working area.

Figure 3:
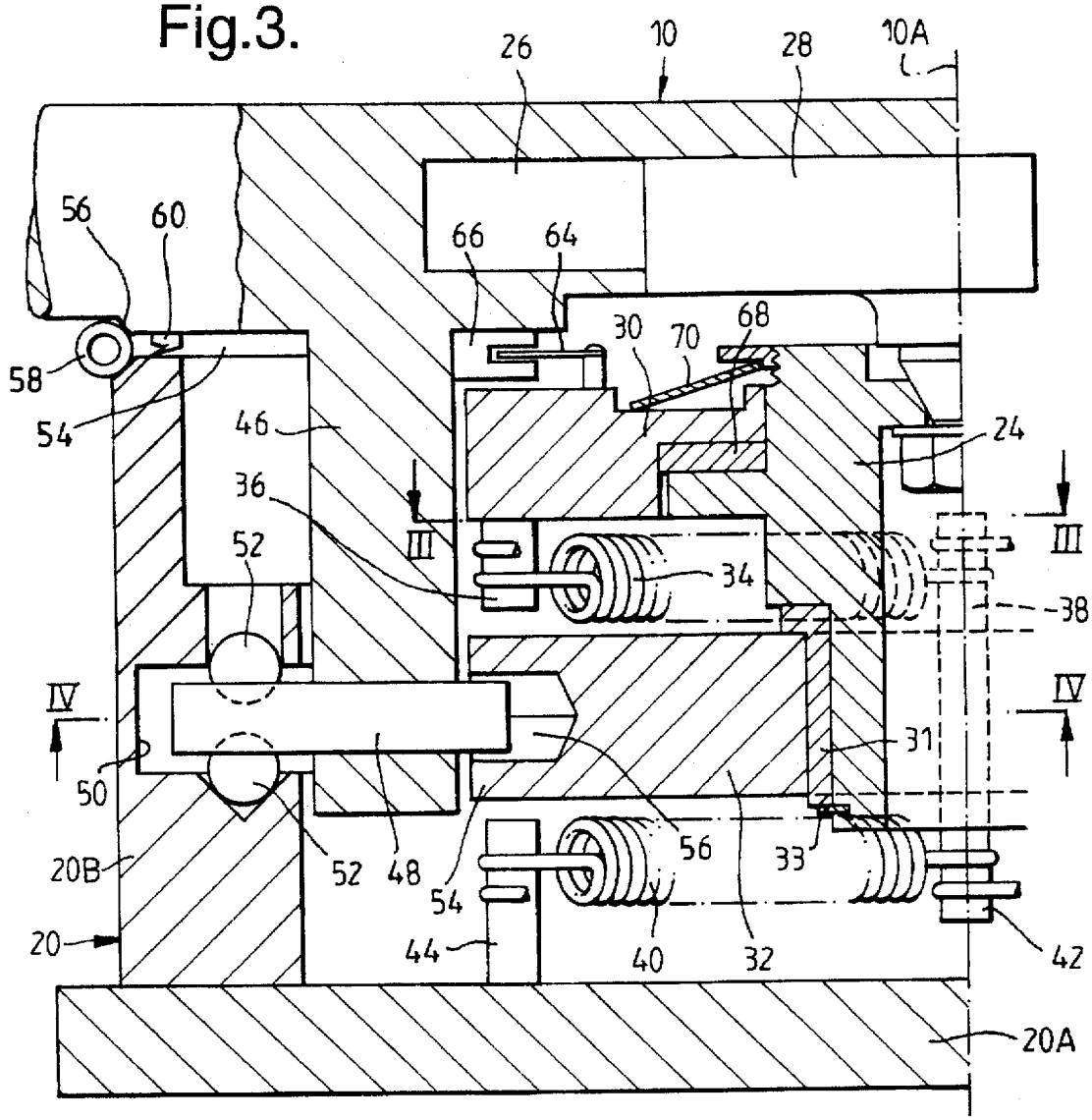
FIG. 3 is a section through a machine component which includes the sealing device of the present invention.

FIG. 3 illustrates such a component. In FIG. 3 there is shown a section through a motorised arm for positioning a probe in the working area of a machine tool. The motorised arm is described and claimed in our United Kingdom patent specification published under No. 2277593 to which the reader is referred for further details. For the purposes of this application it is intended only to show that the invention is very suited to sealing such a motorised arm.

The problem of effectively sealing such a motorised arm arises because not only is there relative rotation between two parts about an axis for swinging the arm into position, but also the arm is locked in position by springs urging two parts of a rotary kinematic support into place. This action produces relative translations between the two parts as well. Thus a significant clearance must be provided between the two parts and this must be effectively sealed to avoid swarf and fluid getting into the interior of the arm.

Referring now to FIG. 3, the arm comprises a hub 10 which is rotatable within a housing 20 about an axis 10A. The hub 10 includes a depending skirt 46, which fits rotatably inside an upstanding wall 20B of the housing 20. The skirt 46 carries three cylinders 48, which project radially both inwardly and outwardly, and which are equally spaced from each other at angles of 120° around the axis 10A.

One way in which the rotational mounting can be achieved is by having the outwardly projecting end of each of the cylinders 48 run in a groove 50 on the inside of the wall 20B of the housing.

At three locations spaced equally around the axis 10A, the groove 50 is interrupted by a pair of balls 52 which are spaced apart in the axial direction. Each pair of balls defines a pair of surfaces which are mutually convergent in the circumferential direction, and which confronts each other in the axial direction. When the hub 10 is rotated, the outwardly projecting parts of the three cylinders 48 eventually engage with the three pairs of balls 52, giving a total of six points of contact. These six points of contact kinematically define the location of the hub 10 of the arm relative to the housing 20, when located in this position. This is the operative position in which a probe mounted on the arm is used for tool setting or measuring purposes. In this position, it is important that the rotational mounting between the hub 10 and housing 20 should not provide any significant additional constraints, and this is the reason for the somewhat sloppy mounting mentioned above.

The seating of the cylinders 48 in the pairs of balls 52 will inevitably give rise to axial and transverse relative movements of the hub and housing as the cylinders settle into the vee grooves formed by the balls. These relative movements, which are in addition to the relative rotation between the hub and the housing require that sufficient clearance 54 must be left between the relatively moving parts.

The seal of the present invention is particularly effective in these circumstances. As can be seen from FIG. 3 the hub 10 and the housing 20 are modified in order to provide such a seal.

A vee groove 56 is formed between the hub and the housing by cutting angled faces in respective parts thereof to accommodate a spring ring 58 as described above to form an outer seal. Prior to fitting the spring ring 58, an inner face seal 60 is positioned in the clearance 54 to form the second inner part of the sealing device.

The hard metal spring ring is effective in preventing swarf from entering the clearance and damaging the softer face seal 60. At the same time both seals have sufficient compliance to accommodate the relative axial and transverse movements while additionally allowing for the intermittent relative rotation of the hub and housing during indexing of the arm between its operative and non-operative positions.

Although the outer seal in the preferred embodiment has been described as a closely-coiled metal spring, other alternatives are possible. For example, a vee-shaped metal washer or a metal bellows rigidly connected to one of the parts and in rubbing contact with the other, or a ring of metallic or hard plastic bristles in the form of a brush seal, may be used.

The properties required of the outer seal are that the material should be hard enough not to be damaged by metallic swarf, or to wear during relative rotation, but at the same time be compliant enough to accommodate the limited transverse or axial relative movements of the parts of the seal.

We claim:

1. A machine component, comprising:

first and second members, said first and second members being rotatable relative to each other about a longitudinal axis thereof, and being subject to limited relative translational movements;

sealing means for preventing the passage of fluid and particulate matter from an exterior of said component to an interior of said component, said sealing means comprising first and second seals acting in series, with said first seal being exposed to fluid on the exterior of said component, and said second seal being exposed to fluid which has passed through the first seal;

said first and second members being respectively provided on an outer periphery thereof with first and second adjacent surfaces which together form a radially outwardly divergent annular groove extending around said outer periphery;

said first seal being made from a resilient material having a first hardness in the form of an annular coil spring dimensioned to extend around said outer periphery in contact with both of said adjacent surfaces of said annular groove; and said second seal being made from a resilient material which has a second hardness that is less than the first hardness of the material of said first seal and being disposed between, and in sliding contact with, respective third and fourth surfaces of said first and second members.

2. The machine component according to claim 1, wherein:

the first seal is made from a material selected from the group consisting of metal and plastic having said first hardness, with said first hardness being sufficient to resist damage by metallic swarf and wear during relative rotation between said adjacent surfaces.

3. The machine component according to claim 1, wherein:

the second seal is made from a material selected from the group consisting of rubber and plastic having said second hardness, with said second hardness being less than said first hardness and enabling said second seal to press compliantly against said third and fourth surfaces and prevent the passage of fluid therebetween.

4. The machine component according to claim 1, wherein:

said annular coil spring is tapered at one end and the opposite end of said coil spring defines a central opening with said tapered end being inserted into said central opening such that said spring forms a ring.

5. The machine component according to claim 1, wherein:

said first seal is dimensioned such that it is stretched slightly from a relaxed state when positioned in said annular groove, with a resilience of said first seal urging said first seal into contact with both of said adjacent surfaces of said annular groove.

6. The machine component according to claim 1, wherein:

said third and fourth surfaces of said first and second members are axially facing surfaces of said first and second members, and said second seal comprises an annular face seal.

7. A sealing device for use in preventing the passage of fluid and particulate matter between two members which are relatively rotatable about an axis and subject to limited translational movements, wherein said sealing device comprises:

a first seal being made from a resilient material having a first hardness, and being shaped for positioning around the axis of rotation, said first seal having annular surface portions which are shaped for contacting first and second surfaces on the outer periphery of the two members, said annular surface portions being inwardly convergent toward said axis of rotation for exerting inwardly divergent sealing forces on the first and second surfaces of the two members as a result of the resilience of the material; and a second seal being made from a resilient material which has a second hardness that is less than the first hardness and being shaped for positioning around the axis of rotation with axially opposite faces of said second seal being shaped for exerting axially directed sealing forces against third and fourth axially facing surfaces of the two members.

8. The sealing device according to claim 7, wherein:

the first seal is made from a material selected from the group consisting of metal and plastic having said first hardness, with said first hardness being sufficient for resisting damage by metallic swarf and wear during relative rotation between said adjacent surfaces.

9. The sealing device according to claim 7, wherein:

the second seal is made from a material selected from the group consisting of rubber and plastic having said second hardness, with said second hardness being less than said first hardness and having sufficient flexibility for pressing compliantly against said third and fourth surfaces and preventing the passage of fluid therebetween.

* * * * *